United States Patent
Keck et al.

[11] Patent Number: 6,137,927
[45] Date of Patent: Oct. 24, 2000

[54] N-PORT RECONFIGURABLE DWDM MULTIPLEXER AND DEMULTIPLEXER

[75] Inventors: Donald B. Keck, Big Flats; Daniel A. Nolan, Corning, both of N.Y.

[73] Assignee: Corning Incorporated, Corning, N.Y.

[21] Appl. No.: 09/216,435

[22] Filed: Dec. 18, 1998

Related U.S. Application Data

[60] Provisional application No. 60/071,730, Jan. 16, 1998.

[51] Int. Cl.$^7$ ................................................ G02B 6/293
[52] U.S. Cl. ............................... 385/24; 359/127; 385/30
[58] Field of Search ................................ 385/15, 24, 30, 385/31; 359/124, 127, 128

[56] References Cited

U.S. PATENT DOCUMENTS

| | | | |
|---|---|---|---|
| 4,983,195 | 1/1991 | Nolan et al. | 65/4.2 |
| 5,042,898 | 8/1991 | Morey et al. | 385/37 |
| 5,234,672 | 8/1993 | Ruscheweyh | 423/243.08 |
| 5,243,672 | 9/1993 | Dragone | 385/46 |
| 5,295,205 | 3/1994 | Miller et al. | 385/1 |
| 5,396,507 | 3/1995 | Kaminow et al. | 372/20 |
| 5,414,548 | 5/1995 | Tachikawa et al. | 359/130 |
| 5,636,300 | 6/1997 | Keck et al. | 385/24 |
| 5,646,300 | 7/1997 | Kosley, Jr. et al. | 548/475 |
| 5,771,112 | 6/1998 | Hamel et al. | 359/128 |
| 5,862,279 | 1/1999 | Amersfoort et al. | 385/40 |
| 6,049,640 | 4/2000 | Doerr | 385/15 |

OTHER PUBLICATIONS

Zamkotsian et al. "Monolithic Integration of MQW Modulators on an Optical Multiplexer on InP for 100 Gb/s Transmission" Journal of Lightwave Technology, vol. 14, No. 10, Oct. 1996.

IEEE Photonics Technology Letters, vol. 7, No. 4, Apr. 1995, pp. 388–390 "An All–Fiber Dense–Wavelength–Division Multiplexer/Demultiplexer Using Photoimprinted Bragg Gratings", F. Bilodeau et al.

*Primary Examiner*—John D. Lee
*Assistant Examiner*—Sarah Song
*Attorney, Agent, or Firm*—Daniel P. Malley

[57] ABSTRACT

An N-port optical wavelength division multiplexer and demultiplexer includes two evanescent wave couplers connected by N optical paths. Each of the optical paths includes wavelength-selecting elements that are used to select specific wavelengths of light. Light signals composed of N wavelengths of light introduced to an exterior port in one of the couplers are split substantially equally among all the optical paths within the coupler, so that each optical path exiting the coupler includes light of all the wavelengths initially introduced to the coupler. The wavelength selecting elements disposed on each optical path are situated to direct the light in a manner such that light of only the selected wavelengths interferes constructively at a given exterior coupler port and other wavelengths interfere destructively. Consequently, optical signals composed of N wavelengths may be demultiplexed such that N optical paths carry light having one wavelength. Conversely, N optical paths carrying light signals having only one wavelength can be multiplexed into a signal having wavelengths $\lambda_1, \lambda_2, \ldots \lambda_N$. The multiplexed signal is then coupled into up to M+O exterior ports.

35 Claims, 7 Drawing Sheets

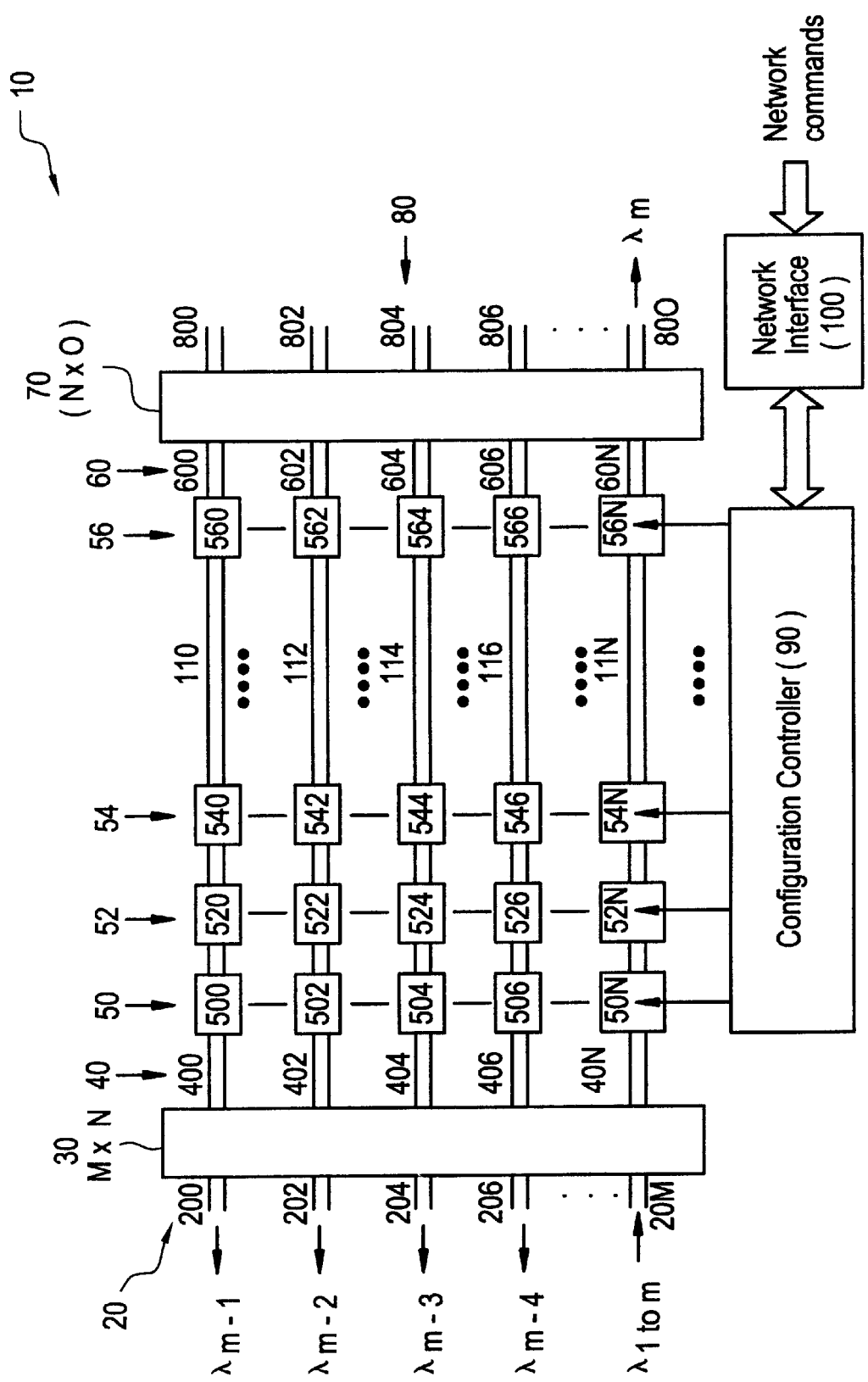

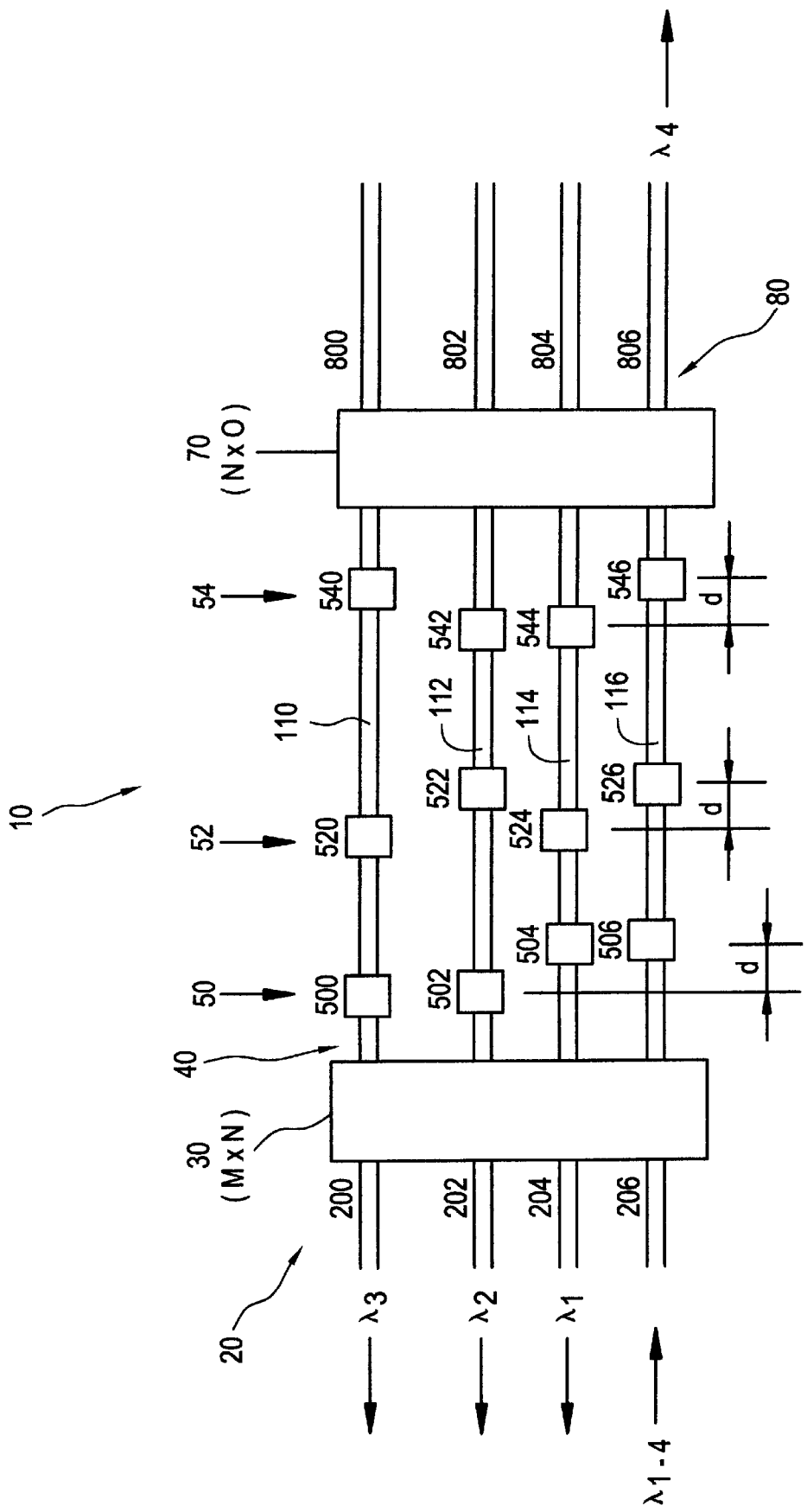

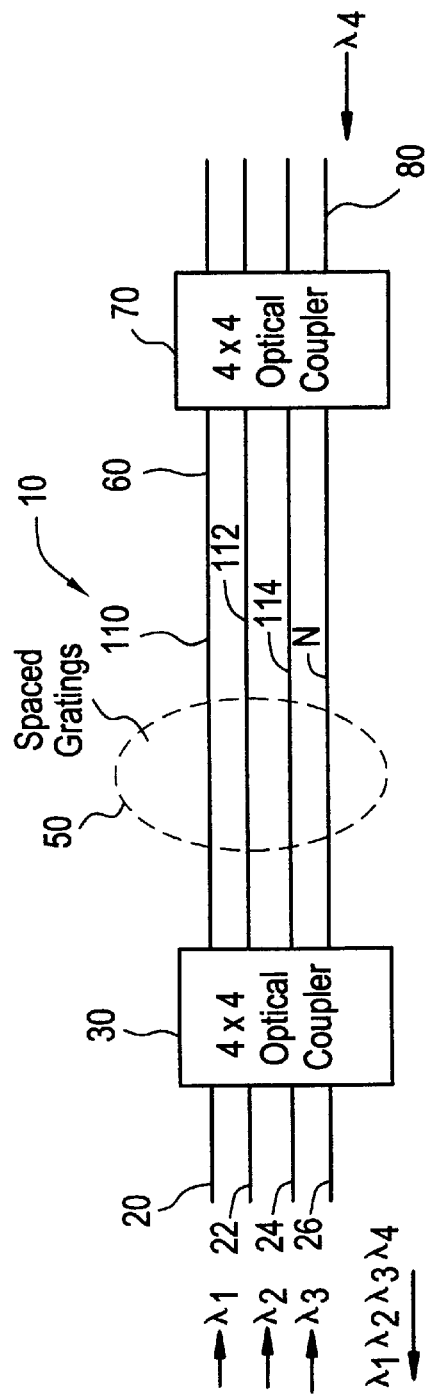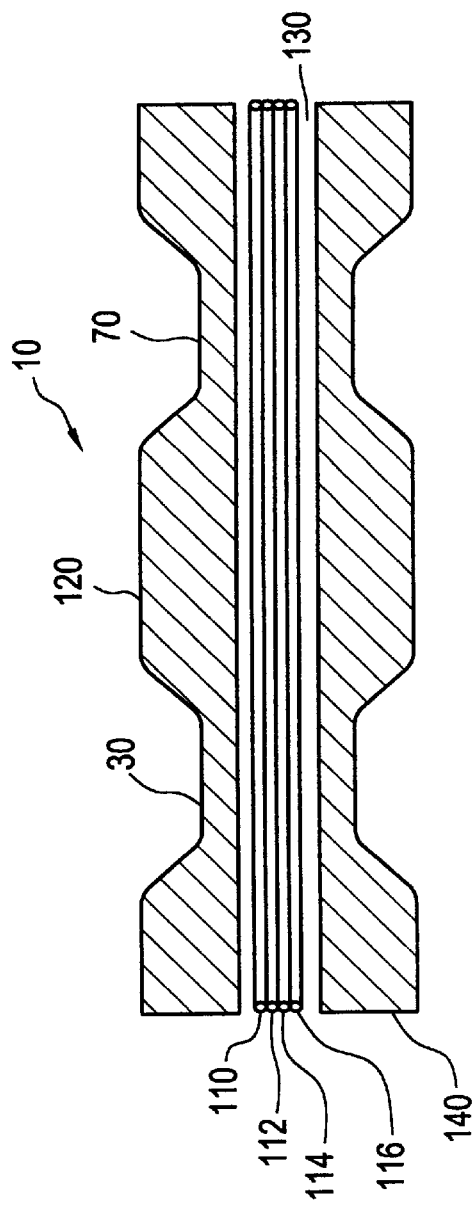

N-PORT RECONFIGURABLE DWDM MULTIPLEXER AND DEMULTIPLEXER

This application is based upon the provisional application Ser. No. 60/071,730, filed Jan. 16, 1998, which we claim as the priority date of this application.

FIELD OF THE INVENTION

The present invention relates generally to multiplexing and demultiplexing devices suitable for single-mode optical telecommunications systems. More particularly, the present invention relates to a reconfigurable, monolithic dense wavelength division multiplexer (DWDM) device that may be also advantageously employed to demultiplex light signals having multiple wavelengths.

DESCRIPTION OF THE RELATED ART

Optical multiplexers, provide reliable, high-speed operation for telecommunication systems carrying high speed traffic that cannot be handled efficiently by devices that operate in the electrical domain. One approach that has been considered involves an optical system that employs wavelength filtering to combine optical signals of various wavelengths through constructive interference. Multiplexing or demultiplexing is implemented by using two star couplers connected by a set of N-optical waveguide paths. Light that is composed of a plurality of wavelengths is coupled into N optical paths, with the power substantially equally divided among the paths. Each optical path has a different optical path length for a given wavelength of light. Thus, a light signal undergoes a different phase shift for each of the optical paths it traverses. Each optical path is selected to produce constructive interference for a particular wavelength of light and destructive interference for other wavelengths, causing each of the paths to carry light signals of a pre-selected wavelength, thereby effecting a demultiplexing function. The reverse operation provides a multiplexing function. There are several disadvantages to this approach. First, there are the problems related to the design and manufacture of a star coupler. In addition, the coupling of light between a planar waveguide, such as a star coupler, and an optical waveguide fiber is a difficult, exacting task. Third, the device cannot be reconfigured, forcing system designers to employ rigid designs having limited flexibility.

In another approach that has been considered, fiber based Mach-Zehnder devices with gratings have been used to multiplex a wavelength or a series of wavelengths onto one fiber. These devices are concatenated to demultiplex several signals, each having a different wavelength, onto several fibers. However, concatenation yields a more complex mechanical system, with attendant cost and reliability concerns. Additionally, the concatenation process would introduce coupling losses and reflections, thereby limiting the performance of such a system, as light signals would be spread and more separation would be required between pulses to maintain a given bit error rate. As in the approach discussed above, concatenated devices cannot be reconfigured, forcing system designers to employ rigid designs having limited flexibility.

The present invention recognizes that it will be highly advantageous to provide a reconfigurable monolithic DWDM capable of handling multiple wavelengths thereby eliminating the need for concatenating multiple devices.

SUMMARY OF THE INVENTION

The present invention provides such advantages and addresses such needs. A reconfigurable DWDM is disclosed that is capable of directing light of a given wavelength to any exterior port of the device in response to a network command, providing network operators with much needed flexibility. Further, because the device is monolithic, the disadvantages of concatenated systems are avoided. Finally, the difficult task of interfacing planar devices with fiber is likewise avoided.

One aspect of the present invention relates to a monolithic optical device for wavelength division multiplexing or demultiplexing of a plurality of light signals. A wavelength or a plurality of wavelengths characterizes each of the plurality of light signals. The optical device includes a first evanescent wave coupler having M exterior ports and N interior ports, wherein signal light power is uniformly coupled between the M exterior ports and the N interior ports. A second evanescent wave coupler having N interior ports and O exterior ports is also included, wherein the signal light power is uniformly coupled between the N interior ports and the O exterior ports. N optical paths connect each of said N interior ports of the first coupler, respectively, to a corresponding one of the N interior ports of the second coupler. A plurality of wavelength selecting elements are disposed on each of the N optical paths for routing each of the plurality of light signals to a selected M or O exterior port on the basis of the wavelength or the plurality of wavelengths.

In another aspect of the present invention, a method for manufacturing a device for wavelength division multiplexing or demultiplexing of light signals is disclosed. A wavelength or a plurality of wavelengths characterizes each of the light signals. The method includes the steps of forming a first evanescent wave coupler having M exterior ports and N interior ports (such that signal light power is uniformly coupled between the M exterior ports and the N interior ports); forming a second evanescent wave coupler having N interior ports and O exterior ports (such that the signal light power is uniformly coupled between the N interior ports and the O exterior ports); forming N optical paths to connect each of the N interior ports of the first coupler, respectively, to a corresponding one of the N interior ports of the second coupler; and disposing a plurality of wavelength selecting elements on each of the N optical paths, such that the wavelength selecting element routes light signals to a selected M or O exterior port on the basis of the wavelength or plurality of wavelengths.

In yet another aspect of the present invention, a method for wavelength division multiplexing or demultiplexing of a plurality of light signals in an optical device is disclosed. The optical device includes a first evanescent wave coupler having M exterior ports and N interior ports, a second evanescent wave coupler having N interior ports and O exterior ports, and N optical paths that connect each of the N interior ports of the first coupler to a corresponding one of the N interior ports of the second coupler. The method includes the steps of providing a plurality of wavelength selecting elements disposed on each of the N optical paths; and, routing each of the plurality of light signals to a selected exterior port on the basis of a wavelength or a plurality of wavelengths, wherein each of the plurality of light signals is characterized by the wavelength or the plurality of wavelengths.

The monolithic optical DWDM device of the present invention results in a number of advantages over prior art WDM devices. The present invention avoids the difficult task of coupling of light between planar waveguide devices and optical waveguide fibers. Since the present invention is a monolithic design, the disadvantages of concatenated systems are avoided. As discussed above, such designs yield complex mechanical systems, with attendant cost and reliability concerns. Additionally, the coupling losses and reflections that limit the performance of concatenated systems are avoided, providing better bit error rates. Further, the present invention is reconfigurable, providing system managers with the flexibility needed to meet ever-increasing Network demands.

Additional features and advantages of the invention will be set forth in the detailed description that follows, and in part will be readily apparent to those skilled in the art from the description, or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiments of the invention, and together with the description serve to explain the principles and operation of the invention.

BRIEF DESCRIPTION OF THE DRAWINGS

FIG. 1 is a block diagram of a reconfigurable, monolithic, dense wavelength division multiplexer and demultiplexer according to the present invention;

FIG. 2 is a schematic of a monolithic wavelength division multiplexing and demultiplexing device illustrating grating positioning for a four wavelength device in accordance with a second embodiment of the present invention, showing a demultiplexing operation;

FIG. 3 is a block diagram of a monolithic wavelength division multiplexing and demultiplexing device in accordance with a second embodiment of the present invention showing a multiplexing operation;

FIG. 4 is a sectional view of a monolithic wavelength division multiplexing and demultiplexing device in accordance with a second embodiment of the present invention implemented using fused fiber coupler;

DETAILED DESCRIPTION

Figure 5:
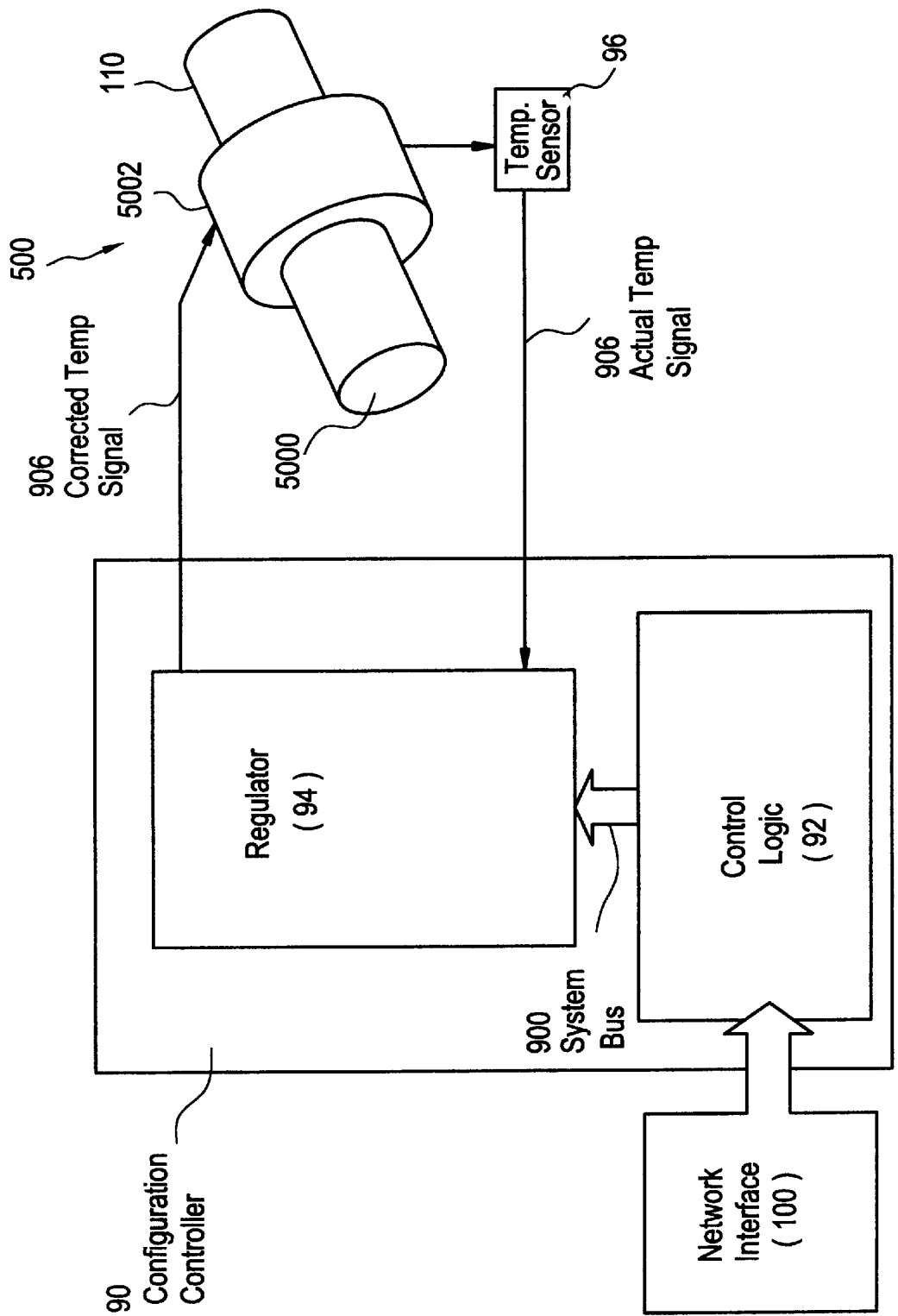
FIG. 5 is a detail view of a wavelength selecting element in accordance with a second embodiment of the present invention showing a chromium heater element and electrode.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the monolithic optical device for DWDM of the present invention is shown in FIG. 1, and is designated generally throughout by reference numeral 10.

In accordance with the present invention, a monolithic optical wavelength division multiplexer and demultiplexer 10 multiplexes light signals of various wavelengths traveling on multiple optical paths onto a single optical path. Since the multiplexer is monolithic, coupling losses and unwanted reflections do not degrade the performance of the multiplexer and very narrow pulses may be accommodated. The coupling difficulties associated with coupling light from a planar, waveguide structure, such as a star coupler, to an optical fiber are avoided. Additionally, a monolithic device is more reliable and less expensive to produce than concatenated multiplexers. The multiplexer 10 functions both as a multiplexer and a demultiplexer. The multiplexer preferably employs evanescent wave couplers 30 and 70. The multiplexer also employs wavelength selecting elements 50, 52, 54 and 56, which provide the multiplexer 10 with the ability to reconfigure based on Network needs. This flexibility allows network managers to dynamically reconfigure the network to respond to increased traffic demands and changing network needs.

As embodied herein, and depicted in FIG. 1, a first embodiment of optical device 10 includes an M×N evanescent wave coupler 30 that has M exterior ports 20 and N interior ports 40. Signal light power is uniformly coupled between the M exterior ports 20 and the N interior ports 40. For example, a light signal entering exterior port 200 will be equally divided and appear at interior ports 400, 402, 404, 406 and 40N. The M×N coupler 30 operates in both directions such that it also uniformly couples light entering N interior ports 40 into exterior ports 20. Optical device 10 also includes an N×O evanescent wave coupler 70 that has N interior ports 60 and O exterior ports 80. The N×O coupler 70 functions in the same manner as the M×N coupler 30. A light signal entering interior port 600 will be equally divided and appear at exterior ports 800, 802, 804, 806 and 80O. Like M×N coupler 30, the N×O coupler 70 functions to couple light from both directions. N optical paths 110, 112, 114, 116 . . . 11N connect the N interior ports 40 of the M×N coupler 30 with the N interior ports 60 of the N×O coupler 70. The N optical paths 110, 112, 114, 116 . . . 11N provide a unique phase shift to light signals depending on the wavelength or wavelengths of the light propagating in the particular optical path. A plurality of wavelength selecting elements 50, 52, 54 and 56 are disposed on each of the optical paths 110 . . . 11N. Each element 50, 52, 54, and 56 is tuned to a particular wavelength. Each of wavelength selecting elements 50, 52, 54 and 56 further includes sub-elements 500-56N forming a matrix of wavelength selecting sub-elements. Thus, sub-elements 500, 502, 504, 506 and 50N are tuned to the same wavelength. Configuration controller 90 is connected to the wavelength selecting elements 50, 52, 54 and 56. The configuration controller 90 functions to individually control each of the sub-elements 500-56N. The configuration controller is connected to Network interface 100. Network configuration commands are relayed to Configuration controller 90 via Network interface 100.

Figure 6:
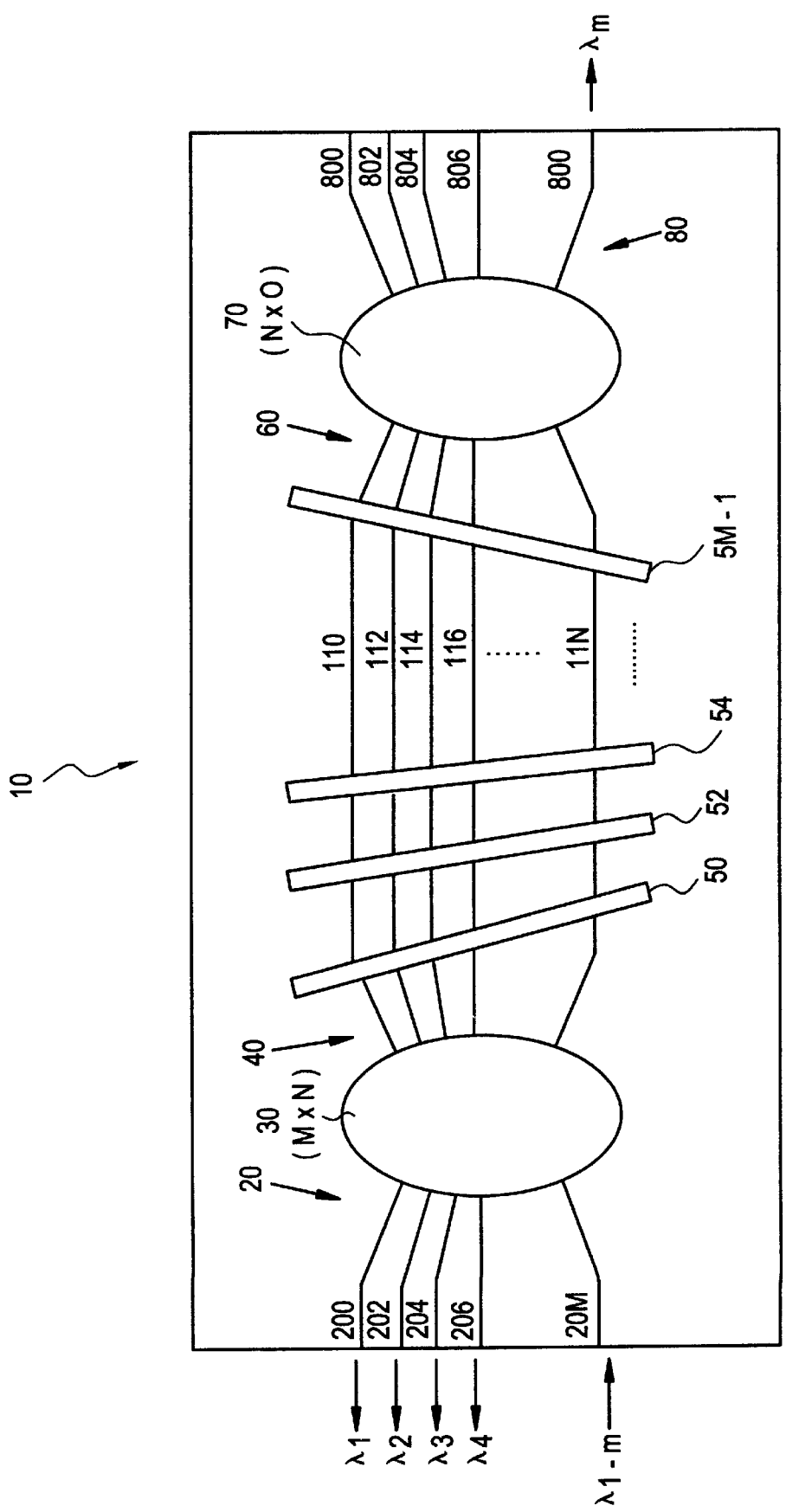
FIG. 6 is a schematic of a monolithic wavelength division multiplexing and demultiplexing device implemented using planar coupler technology in accordance with a third embodiment of the present invention.
Figure 7:
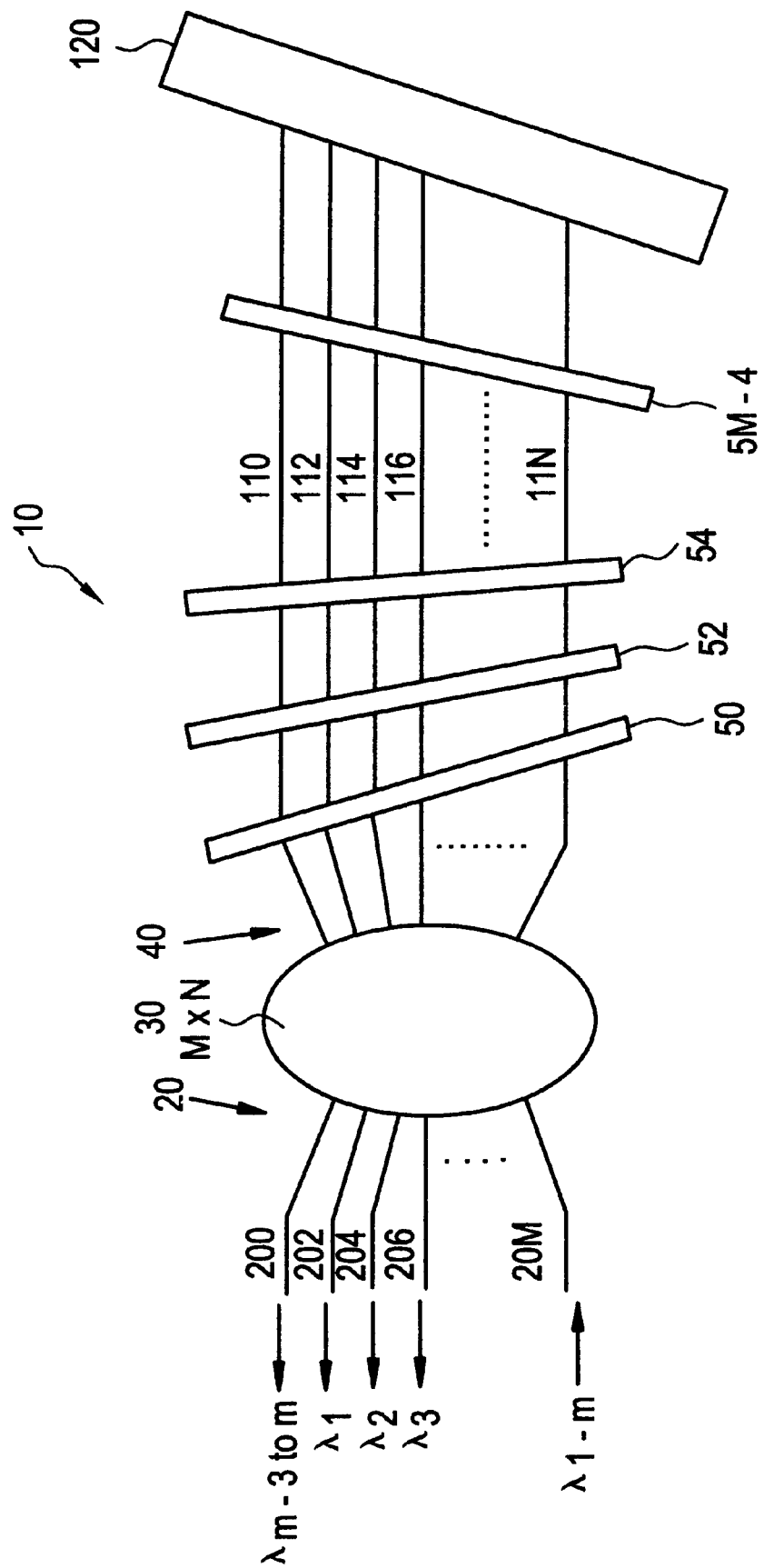
FIG. 7 is a schematic of a monolithic wavelength division multiplexing and demultiplexing device implemented using planar coupler technology and a mirror in accordance with a fourth embodiment of the present invention; and, FIG. 8 is a detail view of a wavelength-selecting element in accordance with the third and fourth embodiments of the present invention showing a voltage modulator element.

Both couplers 30 and 70 may be of any suitable well-known type, but there is shown by way of example, a fused optical waveguide fiber coupler in FIG. 4, a planar arrangement that is shown in FIG. 6, or a planar-mirror arrangement shown in FIG. 7. These examples will be discussed further below. Of particular interest in the planar arrangement is an N×N free-space coupler that uses two linear arrays of waveguides separated by a free-space region.

The N optical paths 110, 112, 114, 116 . . . 11N may be of any suitable well-known type, but there is shown by way of example, optical waveguide fibers in FIG. 4 or optical waveguides in a planar arrangement shown in FIG. 6. However, the choice is largely dependent on the technology used in implementing the couplers 30 and 70 because of the integrated monolithic nature of the device 10.

Figure 8:
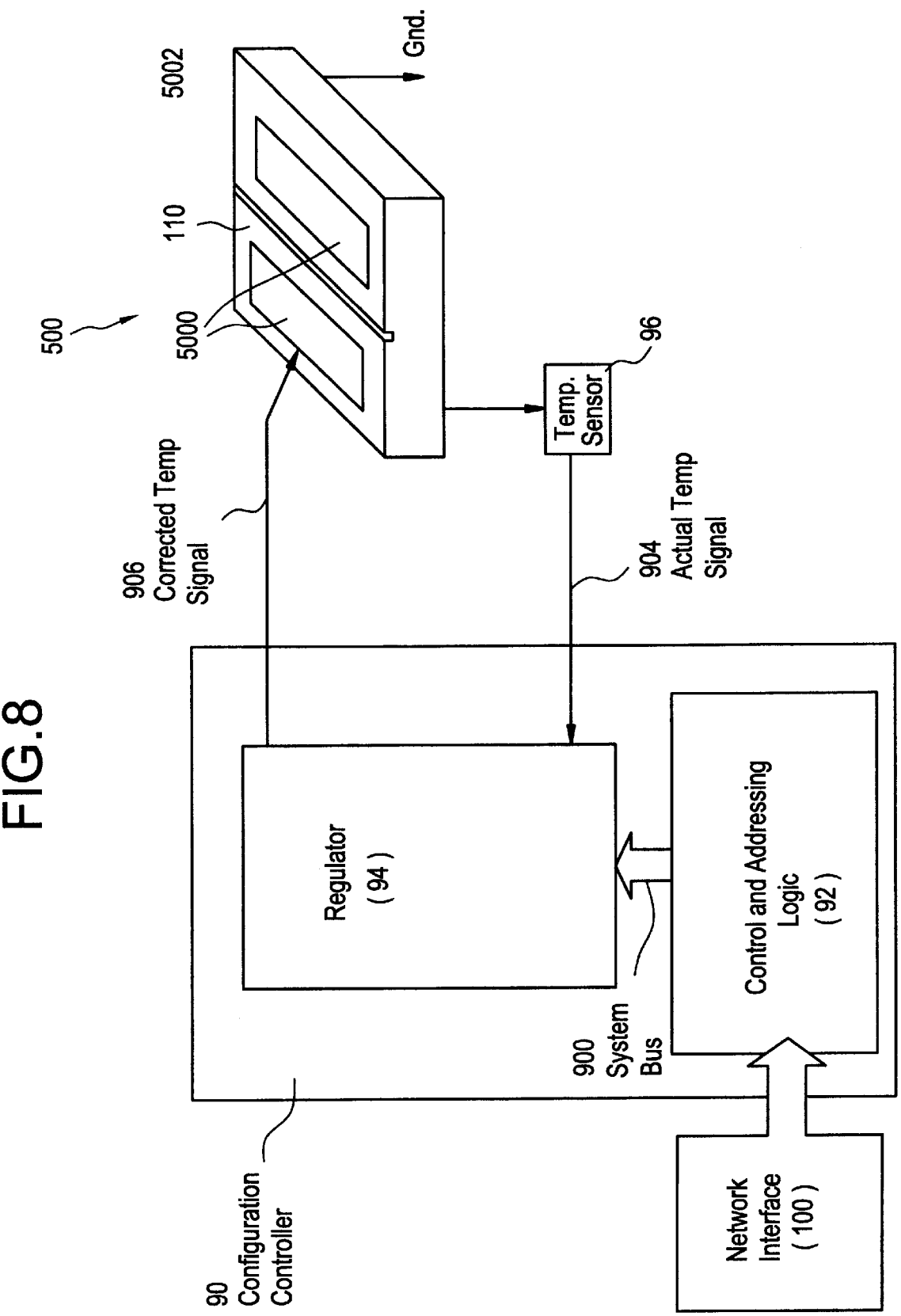

Wavelength selecting elements 50, 52, 54 and 56, and sub-elements 500 . . . 56N may be of any suitable well-known type, but there is shown by way of example, reflective elements such as gratings or mirrors (FIG. 2). Gratings that are fully reflective or partially transmissive are suitable. Gratings in combination with chromium heater elements are shown in FIG. 5. Lithium niobate or indium phosphide waveguides used as the N optical paths in combination with voltage modulators are shown in FIG. 8. Of course, the invention is not limited to these embodiments, but any method of altering the phase differences among the N optical paths 110 . . . 11N is applicable. For example, any means to vary the refractive index, the refractive index delta, the path length, or core diameter will produce the desired effect.

Configuration controller may be of any suitable well-known type, but by way of example, the configuration controller 90 can be implemented in a microprocessor-based system using a Programmable Logic Array (PLA) device having on-chip memory. A look-up table is stored in memory to store all possible combinations of wavelength with respect to the exterior port used for input and output. A Network configuration command is written to the configuration controller in the form of a digital word. The digital word addresses on chip memory to access the appropriate settings for each combination.

Network interface 100 may be implemented using any suitable well-known means. For example, a digital bus system adapted to the particular Network environment is suitable for this application. The bus system includes a data bus and control bus. The Interface 100 is capable of buffering data and utilizes data transceivers to provide two-way communication between optical device 10 and a network processor.

Operation of optical device 10 is explained by way of the following example. A configuration command is sent by the Network and received by the Network interface 100. The Network interface 100 allows the optical device 10 to be adaptable to the different data formats and signal levels of various Network environments. Network interface 100 buffers the Network commands and writes the command to the Configuration controller 90 via the bus system as a control word. The control word is actually an address that accesses a location in memory to retrieve the appropriate settings stored in the look-up table. The retrieved data is used by the configuration controller 90 to individually drive each sub-element 500 . . . 56N. As discussed above, the N optical paths 110, 112, 114, 116, and 11N provide a unique phase shift to light signals depending on the wavelength or wavelengths of the light signal propagating in them. When a sub-element is driven it acts to further shift the phase of the selected light signal in accordance with the Network command. This additional phase shift causes constructive interference of the selected light signals and destructive interference of all other light signals traversing that particular optical path. Thus, as shown in FIG. 1, a light signal characterized by wavelengths $\lambda_{1-M}$ enters exterior port 20M and is coupled into interior ports 400, 402, 404, 406 through 40N. Elements 50 [500, 502, 504, 506 . . . 50N] are tuned to $\lambda_1$. Configuration controller 90 activates sub-element 506, which in turn, provides an additional phase shift to light of wavelength $\lambda_1$. Using constructive interference in the optical path, sub-element 506 directs light having wavelength $\lambda_1$ to appear at exit port 206 of the M×N coupler. Due to destructive interference, light of wavelengths $\lambda_{2-M}$ does not appear at exterior port 206. In this manner, optical device 10 can be dynamically reconfigured to route a light signal of a given wavelength from any of exterior ports 20 and 80 to any other of the exterior ports 20 and 80.

In a second embodiment of the invention, as embodied herein and shown in FIG. 2, a fused coupler DWDM 10 is disclosed. In this embodiment, wavelength-selecting elements 50, 52, and 54 are implemented by using gratings as sub-elements 500–546. FIG. 2 is a schematic illustrating the demultiplexing operation and a suitable placement of gratings 500–546 in accordance with the second embodiment of the present invention. This embodiment is shown in FIG. 2 as a 4×4 WDM for ease of illustration. One of ordinary skill in the art will recognize that the principles disclosed herein can readily be applied to yield an M×O device as shown in FIG. 1.

As embodied herein, and depicted in FIG. 2, optical device 10 includes four optical fibers 110, 112, 114, and 116, which constitute the N optical paths. The four optical fibers 110, 112, 114, and 116 connect the interior ports 40 and 60, of the two 4×4 fused couplers 30 and 70, respectively. A plurality of gratings 500–546 are spaced along the respective fibers 110–116 between couplers 30 and 70. The portions of fibers 110–116 between couplers 30 and 70 are preferably equal in length.

The gratings 50, 52, and 54 reflect light at the wavelengths $\lambda_1$, $\lambda_2$ and $\lambda_3$, respectively. When light is reflected back to the 4×4 coupler 30, the exterior port to which the reflected light will be directed is determined by the relative phases of the interacting signals as discussed in greater detail below.

The operation of a 4×4 coupler, which may suitably be employed as either coupler 30 or coupler 70, has been described in U.S. Pat. No. 5,636,300 entitled "M×O Multiplex Demultiplex Component" which is assigned to the assignee of the present invention and incorporated herein by reference in its entirety. For the sake of example, it is assumed that light is input through fiber 116 into coupler 30 at port 206, and the device is designed so that an equal power splitting occurs amongst the portions of the fibers 110–116 between the couplers 30 and 70. In the absence of the gratings 500–546, light arriving at coupler 70 derived from the light input through fiber 116 will be 180 degrees ahead in phase compared to any other light coupled using fibers 110–116. Consequently, coupler 70 will operate to output the light input on fiber 116 to port 806. Mathematically, the coupling can be expressed with the following 4×4 matrix as $$M = \begin{vmatrix} \sqrt{.25} & -\sqrt{.25} & -\sqrt{.25} & -\sqrt{.25} \\ -\sqrt{.25} & \sqrt{.25} & -\sqrt{.25} & -\sqrt{.25} \\ -\sqrt{.25} & -\sqrt{.25} & \sqrt{.25} & -\sqrt{.25} \\ -\sqrt{.25} & -\sqrt{.25} & -\sqrt{.25} & \sqrt{.25} \end{vmatrix} \quad (1)$$

The minus sign in the matrix accounts for the differences in phase of the light coupled to fibers 110, 112, and 114 compared with the light coupled out of light fiber 116. Physically, this means that light input to coupler 30 is 180 degrees ahead of that which reaches coupler 70. In appropriately adjusting the phases, the second embodiment of the present invention employs wavelength selecting elements in the form of properly positioned gratings, or gratings used in combination with heaters, as discussed further below. For example, when light is reflected back from gratings 504 to the coupler 30, the optical path length of the relevant portion of fiber 114 can be effectively adjusted. In order to output light to a specific exterior port, a fiber's optical length is reduced by placing its grating further from the input 4×4 coupler 30. This follows directly from the reciprocity theorem and application of the matrix in equation 1 above. Light having wavelength $\lambda_1$ is reflected from a first series of gratings 500–506 and is output on fiber 114 at port 204. Light reflected from a second series of gratings 520–526 at wavelength $\lambda_2$ is output onto fiber 112 at port 202. Light having wavelength $\lambda_3$ is reflected by a third set of gratings 540–546 and is output on fiber 110 at port 200, as shown. In FIG. 2, the gratings are appropriately positioned with respect to the other gratings of the series to utilize the constructive and destructive interference of light to achieve this result.

Grating positioning will be explained by way of example. Note that in FIG. 2, sub-element 504 is displaced a distance "d" from gratings 500 and 502. In this example, this displacement causes $\lambda 1$ to appear at exterior port 204. In the second wavelength selecting element 52, grating 522 is displaced from gratings 520 and 524, causing $\lambda 2$ to appear at exterior port 202. The distance that the gratings are displaced is given by d, where $$d = \frac{\lambda}{2n} \pm \frac{M\lambda}{n}; \tag{2}$$

where M is a whole number. In equation 2, n is the index of refraction of the fiber.

These grating displacements are extremely small. The N optical paths may be fine tuned or trimmed by changing the refractive index using photorefraction techniques. Also, optical path lengths can be changed via different refractive index deltas rather than actual grating position differences. Instead of displacing the gratings, the sub-elements 500–546 are aligned in matrix form as shown in FIG. 1. The sub-elements consist of a combination of chromium heaters and gratings. The chromium heaters are positioned between the gratings. By heating the optical path, the refractive index of the material changes, causing the optical path length to be altered. Alternatively, the grating itself may be heated or both the path and the grating. In this way, the optical device 10 is dynamically reconfigured. One of ordinary skill in the art will appreciate that when a given sub-element is heated the configuration controller 90 will adjust subsequent sub-elements along the optical path to account for the altered optical path length and the associated phase shift. This is done to ensure that constructive interference of the selected signal and destructive interference of all other signals in that optical path is maintained.

The second embodiment of optical device 10 is based on a Mach-Zehnder device that is known for its narrowband wavelength capabilities. It is able to provide wavelength separation on the order of tens of nanometers or smaller. Mach-Zehnder devices are discussed, for example in U.S. Pat. No. 5,295,205 that is hereby incorporated by reference in its entirety. Evanescent wave fiber couplers 30 and 70 are joined by four optical fibers 110–116. Again, it will be recognized by persons of ordinary skill in the art that while four fibers are shown in FIG. 2, N fibers may be employed in this design.

FIG. 3 is a block diagram of the second embodiment of the present invention showing an example of multiplexing light signals using the coupler depicted in FIG. 2. It will be noted that while FIG. 3 shows 4×4 couplers, couplers of any size may be employed. Further, the number of interior and exterior ports need not be equal so that generally, M×O operation may be achieved.

Each of the fibers 110–116 includes gratings represented generally by 50 and are not individually shown. The gratings are displaced as shown in FIG. 2. As discussed in FIG. 2, these gratings reflect light of a specific wavelength $\lambda_1, \lambda_2$, or $\lambda_3$, respectively. In a multiplexing application, light of wavelengths $\lambda_1, \lambda_2$, and $\lambda_3$, is coupled into fibers 110–116 by coupler 30. The light of wavelength $\lambda_4$ is coupled into fibers 110–116 by coupler 70. The optical device 10 operates to combine light of wavelengths $\lambda_1\lambda_2\lambda_3\lambda_4$. The multiplexed signal exits optical device 10 at exterior port 26 on optical fiber 116.

In accordance with the second embodiment of the present invention, a multiplexer/demultiplexer Mach-Zehnder device 10 is preferably formed as a monolithic structure as shown in FIG. 4. Device 10 contains overclad couplers 30 and 70 that are joined by a phase shifting region 120. The device 10 is formed by inserting optical fibers 110, 112, 114 and 116 into the bore 130 of a tube matrix glass 140. As shown in FIG. 4, there are four fibers but a greater or lesser number N may suitably be employed. Each of the optical fibers 110–116 has a core surrounded by cladding of refractive index lower than that of the core. The fiber cores may have different refractive indices and the fiber claddings may have different refractive indices. The refractive index of that portion of the matrix glass tube adjacent the fibers is less than the lowest refractive index of either of the fiber claddings. The combination of tube and fibers is referred to as a coupler preform. The preform is processed in a manner that collapses the tube onto uncoated lengths of fiber to form couplers. Processes for coupler formation are known and are disclosed, for example, in U.S. Pat. No. 5,295,205 which is incorporated herein by reference in its entirety. Each of the connecting fibers 110–116 includes an optical waveguide optical fiber having an elongated core in which light is guided toward a core portion of predetermined length.

As discussed above, fibers 110–116 also have embedded therein a plurality of grating elements extending with a substantially equal longitudinal spacing substantially normal to the longitudinal axis. A grating element reflects a single wavelength within a narrow range about a central wavelength determined by the spacing of the grating elements and by the index of refraction of the core. Such gratings, and processes for forming them are known and disclosed, for example, in U.S. Pat. No. 5,042,898 which is incorporated herein by reference in its entirety.

FIG. 5 is a detail view of the interaction of wavelength selecting sub-element 500 and the configuration controller 90 as shown in FIG. 1. Configuration controller 90 includes control logic 92, and regulator 94. System bus 900 connects the control logic 92 to regulator 94, which is connected to heater 5002. Note that sub-element 500 includes the grating 5000 disposed on the core of fiber 110, and the chromium heater 5002, shown in FIG. 5 as being disposed around fiber 110. Heater 5002 is connected to temperature sensor 96. Temperature Sensor 96 is connected to the regulator 94 by the actual temperature signal line 904 to form a control loop. The temperature of each sub-element 500–546 must be accurately controlled to ensure that the refractive indexes of fibers 110-11N are adjusted properly. One of ordinary skill in the art will recognize that any suitable means of heating and regulating the heating of fiber 110 will suffice.

The operation of the configuration controller 90 shown in FIG. 5 is as follows. The Network interface 100 sends a configuration command to configuration controller 90. The command is received by control logic 92. Control logic 92 converts the command into the proper temperature settings for each sub-element 500–546. A command signal is transmitted to individual sub-elements via the regulator 94 on system bus 900. Note that due to local conditions present at individual sub-elements, the temperature at each sub-element may vary from the nominal temperature sent to the regulator on system bus 900. Thus, the temperature of the sub-element must be regulated to ensure its proper functioning. To accomplish this, temperature sensor 96 feeds regulator 94 with the actual temperature signal 904. The regulator 94 subtracts the nominal temperature value received from the control logic 92 from the actual value 904 to produce an error signal. The error signal, which may be positive or negative, is then added to the command signal 900 at adder 96 to produce the corrected temperature signal 906. One of ordinary skill in the art will recognize that any suitable means of accurately controlling the temperature of the sub-elements 500–546 may be used.

In a third embodiment of the present invention, as embodied herein and shown in FIG. 6, a schematic view of monolithic planar device 10 is shown. Optical device 10 includes an M×N evanescent coupler 30 which has M exterior ports 20 and N interior ports 40. Exterior ports 20 are used to access the exterior of the device 10. The interior ports 40 are individually connected to N optical paths 110-11N. The N optical paths 110-11N are connected at the other end to the N interior ports 60 of N×O evanescent coupler 70. N×O coupler 70 also includes exterior ports 80, which access the exterior of device 10. Wavelength selecting elements 50-5M-1 are disposed on the N optical paths 110-11N. Note that the sub-elements are utilized in this embodiment, but are not shown in FIG. 6 for ease of illustration. Wavelength selecting element 50 is tuned to $\lambda_1$, element 52 is tuned to $\lambda_2$, and element 5M-1 is tuned to the M-1$^{th}$ wavelength supported by the device 10. Couplers 30 and 70 may be of any suitable well-known type, but there is shown by way of example, a free-space N×N planar coupler, which includes a planar arrangement of two linear waveguide arrays separated by a free space region. As in the fused coupler embodiment discussed above, a light signal having wavelengths $\lambda_{1-M}$ enters exterior port 20M as shown in FIG. 6 and is equally divided, appearing at every interior port 40. As discussed above, wavelength selecting elements 50-5M-1 may be of any suitable well-known type that alters the phase differences among the N optical paths 110-11N and will be discussed in conjunction with FIG. 8.

In the embodiment shown in FIG. 6, there are several factors which determine the exterior port a given wavelength will exit. First, the curvature of the free space interface causes the light from each waveguide to be focused toward the ports on the other side of the free-space interface. Second, if the wavelength selecting elements are implemented as Bragg gratings, the angle at which the wavelength selecting elements are positioned relative to the waveguides is also a factor. This is because the angle affects the relative delay of the light from each guide. By varying the angle, a phased array is created that steers the light beam toward the desired exterior port. The position of each guide relative to the other waveguides at the free-space interface causes light to be focused toward the ports on the other side of the free-space interface. Each wavelength is finely adjusted to a particular port, by the additional delay effected by the Bragg reflector. The relationship between the phase delay and the steering angle is shown by the following equation:

$$\phi(\lambda) = \cos^{-1}[d \sin \theta_\lambda / \lambda]; \quad (3)$$

Where $\phi$ is the phase delay caused by the Bragg reflector, $\theta$ is the steering angle, $\lambda$ is the wavelength of the light beam being steered, and d is the separation between waveguides. Thus, the phase delay for a given wavelength effects the position of focus of the reflected light. Finally, the device is made reconfigurable by placing heaters either on the optical path [110 . . . 11N] between gratings, or by heating the gratings themselves, or by doing both. One of ordinary skill in the art will appreciate that when a given sub-element is heated the configuration controller 90 will adjust subsequent sub-elements along the optical path to account for the altered optical path length and the associated phase shift. This is done to ensure that constructive interference of the selected signal and destructive interference of all other signals in that optical path is maintained.

The operation of device 10 shown in FIG. 6 is explained by way of example. A light signal characterized by wavelengths $\lambda_{1-M}$ enters exterior port 20M and is coupled into interior ports 400, 402, 404, 406 and 40N (not individually shown). Configuration controller 90 (not shown) actuates wavelength-selecting elements 50-5M-1 in accordance with the network command. Element 50 is tuned to $\lambda_1$ and is activated to direct light having wavelength $\lambda_1$ to exterior port 200 of the M×N coupler. Due to destructive interference, light of wavelengths $\lambda_{2-M}$ does not appear at exterior port 200, whereas the selected signal having $\lambda_1$ appears at port 200 because of constructive interference. In like manner, element 52 directs a selected light signal of $\lambda_2$ into exterior port 202, and so on. In this manner, optical device 10 can be dynamically reconfigured to route a light signal of a given wavelength from any of exterior ports 20 and 80 to any other of the exterior ports 20 and 80.

In a fourth embodiment of the present invention, as embodied herein and shown in FIG. 7, a schematic view of monolithic planar device 10 is shown. In this embodiment the N×O coupler 70 of FIG. 6 is replaced by mirror 120. In the fourth embodiment each wavelength selecting element [50, 52, 54, . . . , 5M-4] is tuned to a wavelength. Coupler 30 has M exterior ports 20 and N interior ports 40. The N interior ports are connected to N waveguides [110 . . . 11N] which terminate at mirror 120. Wavelength selecting elements 50, 52, 54, through 5M-4 are disposed on the waveguides 110 through 11N. Note that light of wavelengths of $\lambda_{1-M}$ is supported by device 10. However, there are M-4 wavelength selecting elements in device 10. Thus, wavelengths $\lambda_{M-3}$ to $\lambda_M$ do not have matching wavelength-selecting elements. In the fourth embodiment, the mirror causes all wavelengths that do not have a wavelength-selecting element to be reflected back to output port 200.

The operation of device 10 shown in FIG. 7 is explained by way of example. Light of wavelengths $\lambda_{1-M}$ is directed into exterior port 20M. Element 50 is tuned to $\lambda_1$ and the sub-element (not shown) disposed on waveguide 112 is activated by the configuration controller (not shown) causing $\lambda_1$ to exit device 10 at port 202. Because $\lambda_{M-3}$ to $\lambda_M$ do not have gratings they are reflected back and exit the device at port 200. The port at which a given wavelength exits the device selected by heating the optical path at the sub-element to change the index of the path [110 . . . 11N]. It should also be noted that the sub-element itself can be heated to effect the desired phase shift.

It will be apparent to those of ordinary skill in the pertinent art that modifications and variations can be made to wavelength selecting elements [50 . . . 5M-1] of the third embodiment, or [50 . . . 5M-4] of the fourth embodiment of the present invention depending on the materials used to construct device 10. For example, FIG. 8 is a detail view of the interaction of wavelength selecting sub-element 500 and the configuration controller 90 as shown in FIG. 1 as applied to the third and fourth embodiments. Configuration controller 90 includes control logic 92 and regulator 94. System bus 900 connects the control logic 92 to regulator 94. Regulator 92 is connected to sub-element 500. Sub-element 500 includes the material dependent core of waveguide 110 and the voltage modulator 5002. Voltage modulator 5000 is connected to voltage sensor 96. Voltage sensor 96 is connected to regulator 94 by the actual voltage signal line 904 to form a control loop. The voltage supplied to each sub-element 500-56N must be accurately controlled to ensure that the refractive indexes of fibers 110-11N are adjusted properly.

One of ordinary skill in the art will recognize that any suitable means of inducing an electric field around waveguide 110 will suffice as a wavelength-selecting sub-element. The core of waveguide 110 may be of any suitable material, but there is shown by way of example, a lithium niobate or indium phosphide core that provides a voltage or electric field dependent phase shift in the part of the waveguide that lies between coupling region 5002.

The operation of the configuration controller 90 shown in FIG. 8 is as follows. The Network interface 100 sends a configuration command to configuration controller 90. The command is received by control logic 92. Control logic 92 converts the command into the voltage settings to induce the proper electric field for each sub-element 500-56N. The command signal is transmitted to individual sub-elements using via the regulator 94. However, due to local conditions at the individual sub-elements, the voltage actually present at each sub-element may vary somewhat from the nominal voltage. Thus, voltage sensor 96 transmits the actual voltage being supplied to the regulator 94. The regulator 94 subtracts the nominal value received from the control logic 92 via bus 900, from the actual value 904 received from the voltage sensor to produce an error signal. The error signal, which may be positive or negative, is then added to the nominal value by the regulator 94 to produce the corrected voltage signal 906. One of ordinary skill in the art will recognize that any suitable means of accurately controlling the voltage supplied to the sub-elements 500-56N will suffice.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A monolithic optical device for wavelength division multiplexing or demultiplexing a plurality of light signals, each of said plurality of light signals is characterized by a wavelength or a plurality of wavelengths and a signal light power, said optical device comprising:

a first evanescent wave coupler having M exterior ports and N interior ports, wherein the signal light power is uniformly coupled between said M exterior ports and said N interior ports;

a second evanescent wave coupler having N interior ports and O exterior ports, wherein the signal light power is uniformly coupled between said N interior ports and said O exterior ports;

N optical paths for connecting each of said N interior ports of said first evanescent coupler, respectively, to a corresponding one of said N interior ports of said second evanescent coupler; and, a plurality of wavelength selecting elements disposed on each of said N optical paths for routing each of the plurality of light signals to any selected M exterior port or O exterior port on the basis of the wavelength or the plurality of wavelengths.

2. The optical device of claim 1, wherein the wavelength selecting elements are adjustable in accordance with a network command.

3. The optical device of claim 1, wherein at least one of the evanescent couplers is a fused waveguide fiber coupler.

4. The optical device of claim 1, wherein at least one of the first evanescent coupler or second evanescent couplers is a planar coupler.

5. The optical device of claim 4, wherein the planar coupler is an N×N free-space planar coupler.

6. The optical device according to claim 1, wherein the plurality of wavelength selecting elements comprises:

a plurality of reflective elements disposed on the N optical paths, wherein each of said plurality of reflective elements is tuned to reflect light having a specific wavelength selected from the plurality of wavelengths and separated from an adjacent reflective element by an interval.

7. The optical device according to claim 6, wherein the plurality of reflective elements comprise a plurality of mirrors.

8. The optical device according to claim 6, wherein the plurality of reflective elements comprise a plurality of gratings.

9. The optical device of claim 8, wherein each of the N optical paths provides a distinctive phase shift to each of the plurality of wavelengths of light propagating in the N optical paths.

10. The optical device of claim 9, wherein the distinctive phase shift causes constructive interference with a selected light signal and destructive interference with all other light signals propagating in the N optical paths, when one of the plurality of gratings routes the selected light signal to the selected M exterior or O exterior port.

11. The optical device of claim 10, wherein the N optical paths comprise:

a plurality of optical waveguide fibers, wherein each of said plurality of optical waveguide fibers has a refractive index, a refractive index delta, a length, and a core diameter.

12. The optical device of claim 11, wherein routing the selected light signal to the selected M exterior or O exterior port is adjusted by varying the refractive index delta.

13. The optical device of claim 11, wherein routing the selected light signal to the selected M exterior or O exterior port is adjusted by varying the length.

14. The optical device of claim 11, wherein routing the selected light signal to the selected M exterior or O exterior port is adjusted by varying the core diameter.

15. The optical device of claim 10, wherein routing the selected light signal to the selected M exterior or O exterior port is adjusted by varying the interval, thereby causing the distinctive phase shift to create constructive interference with the selected light signal and, destructive interference with all other light signals.

16. The optical device of claim 15, wherein the interval is varied by a distance $\delta$ characterized by the equation:

$$\delta = \frac{\lambda}{2n} + / - \frac{M\lambda}{n},$$

wherein $\lambda$ is the wavelength of the selected light signal, $n$ is the refractive index of the optical fiber, and M is an integer.

17. The optical device of claim 8, wherein each of the plurality of gratings is at least partially transmissive.

18. The optical device of claim 1, wherein the wavelength selective element further comprises:
- a plurality of gratings disposed on the N optical paths, wherein each of said plurality of gratings is tuned to reflect light having a specific wavelength from among the plurality of wavelengths and separated from an adjacent one of said plurality of gratings by an interval;
- a plurality of heaters disposed on the N optical paths and interleaved with said plurality of gratings; and,
- a configuration controller connected to each of said plurality of heaters, wherein said configuration controller dynamically changes the routing of each of the plurality of light signals to the selected M exterior or O exterior port by individually actuating selected ones of said plurality of heaters in response to a network command.

19. The optical device of claim 18, wherein each of the N optical paths provides a distinctive phase shift to each of the plurality of wavelengths of light propagating in the N optical paths.

20. The optical device of claim 19, wherein the distinctive phase shift causes constructive interference with a selected light signal and destructive interference with all other light signals propagating in the N optical paths, when one of the plurality of gratings routes the selected light signal to the selected M exterior or O exterior port.

21. The optical device of claim 20, wherein the N optical path lengths comprise:
- a plurality of optical waveguide fibers, wherein each of said plurality of optical waveguide fibers has a refractive index delta.

22. The optical device of claim 21, wherein the heaters dynamically change the routing of the selected light signal to the selected M exterior or O exterior port by heating selected ones of the plurality of optical waveguide fibers to thereby vary the refractive index delta.

23. The optical device of claim 18, wherein the plurality of heaters further comprise:
- a plurality of electrodes individually connected to the configuration controller, wherein each of said plurality of electrodes is individually actuated by the configuration controller to provide heat energy to the selected ones of the plurality of heaters in accordance with the network command.

24. The optical device of claim 1, wherein the wavelength selective element further comprises:
- a plurality of sub-elements disposed on the N optical paths, wherein each of said plurality of sub-elements is tunable to change the phase of each of the plurality of light signals in accordance with the wavelength; and,
- a configuration controller connected to each of said plurality of sub-elements, wherein said configuration controller dynamically changes the routing of the plurality of light signals to the selected M exterior or O exterior port by individually actuating said plurality of sub-elements in accordance with a network command.

25. The optical device of claim 24, wherein each of the plurality of sub-elements comprise:
- a lithium niobate waveguide element; and
- a voltage modulator connected to said lithium niobate waveguide element, wherein said voltage modulator is individually controlled by said configuration controller and individually actuates said lithium niobate waveguide element by changing the electromagnetic field around said lithium niobate waveguide element.

26. The optical device of claim 25, wherein changing the electromagnetic field induces a phase shift causing constructive interference of a selected light signal and destructive interference of all other light signals propagating in the N optical paths, when routing the selected light signal to the selected M exterior or O exterior port.

27. The optical device of claim 24, wherein each of the plurality of sub-elements comprise:
- an indium phosphate waveguide element; and
- a voltage modulator connected to said indium phosphate waveguide element, wherein said voltage modulator is individually controlled by said configuration controller and individually actuates said indium phosphate waveguide element by changing the electromagnetic field around said indium phosphate waveguide element.

28. The optical device of claim 27, wherein changing the electromagnetic field induces a phase shift causing constructive interference with a selected light signal and destructive interference with all other light signals propagating in the N optical paths, when routing the selected light signal to the selected M exterior or O exterior port.

29. A method for manufacturing a device for wavelength division multiplexing or demultiplexing of light signals, each of said light signals being characterized by a wavelength or a plurality of wavelengths and a signal light power, said method comprising the steps of:
- forming a first evanescent wave coupler having M exterior ports and N interior ports, wherein the signal light power is uniformly coupled between said M exterior ports and said N interior ports;
- forming a second evanescent wave coupler having N interior ports and O exterior ports, wherein the signal light power is uniformly coupled between said N interior ports and said O exterior ports; and
- forming N optical paths to connect each of said N interior ports of said first coupler, respectively, to a corresponding one of said N interior ports of said second coupler; and,
- disposing a plurality of wavelength selecting elements on each of said N optical paths, wherein said wavelength selecting element routes light signals to a selected one of said M exterior or O exterior port on the basis of the wavelength or the plurality of wavelengths.

30. The method of claim 29 wherein said forming steps are carried out such that the device is monolithically formed.

31. The method of claim 29, wherein at least one of the first evanescent coupler or second evanescent coupler is a fused waveguide fiber coupler.

32. The method of claim 29, wherein at least one of the first evanescent coupler or second evanescent coupler is a planar coupler.

33. The method of claim 32, wherein at least one of the first evanescent coupler or second evanescent coupler is an N×N free-space planar coupler.

34. A method for wavelength division multiplexing or demultiplexing of a plurality of light signals in an optical device having a first evanescent wave coupler with M exterior ports and N interior ports, a second evanescent wave coupler having N interior ports and O exterior ports, and N optical paths that connect each of said N interior ports of said first evanescent coupler to a corresponding one of said N interior ports of said second evanescent coupler, said method comprising the steps of:
- providing a plurality of wavelength selecting elements disposed on each of the N optical paths; and,
- routing selected ones of the plurality of light signals to any selected M exterior or O exterior port on the basis of a wavelength or a plurality of wavelengths, wherein each of the plurality of light signals is characterized by said wavelength or said plurality of wavelengths.

35. The method for wavelength division multiplexing or demultiplexing of a plurality of light signals of claim 34, wherein the plurality of wavelength selecting elements are heatable grating elements and the step of routing further comprises:

provioding a distinctive phase shift to each of the plurality of wavelengths of light propagating in the N optical paths, wherein said distinctive phase shift causes constructive interference with a selected light signal and destructive interference with all other light signals propagating in the N optical paths;

reflecting selected ones of the plurality of wavelengths of light, wherein each of the heatable grating elements are tuned to a specific wavelength of light to thereby reflect a light signal characterized by said specific wavelength of light; and, heating selected ones of the heating elements to thereby dynamically change the routing of the selected ones of the plurality of light signals to any selected M exterior or O exterior port.

* * * * *